US011675091B2

United States Patent
Wang et al.

(10) Patent No.: US 11,675,091 B2
(45) Date of Patent: Jun. 13, 2023

(54) RTK GNSS POSITIONING WITHOUT BASE STATIONS

(71) Applicant: QUALCOMM Incorporated, San Diego, CA (US)

(72) Inventors: Min Wang, Tustin, CA (US); Mangesh Chansarkar, Irvine, CA (US); Ning Luo, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/998,621

(22) Filed: Aug. 20, 2020

(65) Prior Publication Data

US 2022/0057530 A1   Feb. 24, 2022

(51) Int. Cl.
*G01S 19/44*   (2010.01)
*G01C 21/28*   (2006.01)
(Continued)

(52) U.S. Cl.
CPC .............. *G01S 19/44* (2013.01); *G01C 21/28* (2013.01); *G01S 19/04* (2013.01); *G01S 19/235* (2013.01)

(58) Field of Classification Search
CPC ........ G01S 19/04; G01S 19/235; G01S 19/32; G01S 19/43–44; G01S 19/51; G01C 21/28
See application file for complete search history.

(56) References Cited

U.S. PATENT DOCUMENTS

| | | | | |
|---|---|---|---|---|
| 5,960,355 A | * | 9/1999 | Ekman | ................. G01S 5/0009 455/524 |
| 6,397,074 B1 | * | 5/2002 | Pihl | ........................ G01S 19/05 455/456.2 |

(Continued)

FOREIGN PATENT DOCUMENTS

| | | |
|---|---|---|
| EP | 574009 A2 * | 12/1993 |
| WO | WO-2019019118 A1 | 1/2019 |

OTHER PUBLICATIONS

J.S. Subirana et al., Ionosphere-free Combination for Dual Frequency Receivers, https://gssc.esa.int/navipedia/index.php/Ionosphere-free_Combination_for_Dual_Frequency_Receivers, 2011 (Year: 2011).*

(Continued)

*Primary Examiner* — Bernarr E Gregory
*Assistant Examiner* — Fred H Mull
(74) *Attorney, Agent, or Firm* — Qualcomm Incorporated

(57) ABSTRACT

Techniques described herein leverage multi-constellation, multi-frequency (MCMF) functionality to provide a local Real-Time Kinematic (RTK) solution for a mobile device in which an initial highly-accurate location determination for the mobile device can be leveraged to generate RTK correction information that can be used to make subsequent, highly-accurate location determinations without the need for measurement information from an RTK base station. This RTK correction information can be applied to Global Navigation Satellite System (GNSS) measurements taken by the mobile device over a long period of time while retaining the ability to produce highly-accurate location determinations for the mobile device. And additional correction information may be obtained and applied to the RTK correction information to extend this period of time even longer.

47 Claims, 8 Drawing Sheets

(51) Int. Cl.
    *G01S 19/04*     (2010.01)
    *G01S 19/23*     (2010.01)

(56) References Cited

U.S. PATENT DOCUMENTS

| | | |
|---|---|---|
| 8,085,196 B2 | 12/2011 | Whitehead |
| 8,976,064 B2 | 3/2015 | Brenner |
| 9,488,729 B2 | 11/2016 | Averin et al. |
| 10,234,562 B2 | 3/2019 | Janky et al. |
| 2008/0309550 A1 | 12/2008 | Sairo et al. |
| 2010/0309044 A1* | 12/2010 | Ische .................. G01S 19/48 |
| | | 342/357.28 |
| 2014/0015712 A1 | 1/2014 | Leandro et al. |
| 2015/0168560 A1 | 6/2015 | Ralphs et al. |
| 2015/0185331 A1 | 7/2015 | Dai et al. |
| 2017/0269231 A1 | 9/2017 | Dai et al. |
| 2019/0154842 A1* | 5/2019 | Adachi .................. G01S 19/43 |
| 2019/0391274 A1 | 12/2019 | Chen et al. |
| 2020/0278451 A1* | 9/2020 | Wei ...................... G01S 19/04 |

OTHER PUBLICATIONS

C.A. Ogaja, Applied GPS for Engineers and Project Managers, ASCE Press, p. 177-179 (Year: 2011).*
International Search Report and Written Opinion—PCT/US2021/042636—ISA/EPO—dated Nov. 10, 2021.
Thomas S., et al., "Precise Relative Ego-Positioning by Stand-Alone RTK-GPS", 2016 13th Workshop on Positioning, Navigation and Communications(WPNC), IEEE, Oct. 19, 2016 (Oct. 19, 2016), pp. 1-6, XP033046097, DOI: 10.1109/WPNC.2016.7822852 [Retrieved on Jan. 17, 2017], Abstract p. 2-p. 4.

* cited by examiner

RTK GNSS POSITIONING WITHOUT BASE STATIONS

BACKGROUND

1. Field of Invention

The present invention relates to generally to the field of satellite-based positioning, and more specifically to error correction of Global Navigation Satellite System (GNSS) terms for more accurate position determination.

2. Description of Related Art

High-accuracy positioning can provide significant value to various modern-day applications for mobile devices. For example, not only is it helpful to have meter-level positioning to determine the lane of the road in which a vehicle is located for autonomous driving applications, it is further helpful to have sub-meter-level positioning to determine where, within the lane, the vehicle is located. Consumer-grade GNSS receivers now offer quality carrier phase measurements, with multi-constellation, multi-frequency (MCMF) functionality.

BRIEF SUMMARY

Real-Time Kinematic (RTK) correction can allow Global Navigation Satellite System (GNSS) receivers to provide more accurate positioning. As explained in more detail herein, this more-accurate positioning is enabled by using carrier-based ranging, based on the carrier wave of GNSS signals, along with measurement information from a base station that allows for differential corrections of errors from various service sources. Techniques described herein leverage multi-constellation, multi-frequency (MCMF) functionality to provide a local RTK solution for a mobile device in which an initial highly-accurate location determination for the mobile device can be leveraged to generate RTK correction information that can be used to make subsequent, highly-accurate location determinations without the need for measurement information from an RTK base station. This RTK correction information can be applied to GNSS measurements taken by the mobile device over a long period of time while retaining the ability to produce highly-accurate location determinations for the mobile device. Additional correction information may be obtained and applied to the RTK correction information to extend this period of time even longer. It can be further noted that, although the correction techniques described herein are described as "RTK correction" embodiments are not so limited. Similar techniques may be made to employ differential correction, based on an initial location, at one or more subsequent locations.

An example method of RTK positioning of a mobile device, according to this description, comprises obtaining a first GNSS measurement at a first time, wherein the first GNSS measurement comprises an ionosphere-free carrier phase combination at a first location of the mobile device, and determining a correction term based at least in part on the first GNSS measurement, and the first location. The method further comprises obtaining a second GNSS measurement at a second time, wherein the second GNSS measurement comprises an ionosphere-free carrier phase combination at a second location of the mobile device. The method also comprises determining the second location of the mobile device at the second time based at least in part on the second GNSS measurement and the correction term. In one example mobile device, the steps may be performed by a processor (e.g., digital signal processor or application processor) in the mobile device. The processor may receive measurements from a GNSS receiver within the mobile device or otherwise in communication with the mobile device. In other examples, all of the functionality may be incorporated into the GNSS receiver, which outputs the determined mobile device locations to another component of the mobile device, such as a processor (e.g., a digital signal processor or an application processor), memory, or display.

An example mobile device, according to this description, comprises a memory, and one or more processing units communicatively coupled with the memory and further communicatively coupled with or configured to execute a GNSS receiver. The one or more processing units are configured to obtain, via the GNSS receiver, a first GNSS measurement at a first time, wherein the first GNSS measurement comprises an ionosphere-free carrier phase combination at a first location of the mobile device, and generate a correction term based at least in part on the first GNSS measurement, and the first location. The one or more processing units are additionally configured to obtain, via the GNSS receiver, a second GNSS measurement at a second time, wherein the second GNSS measurement comprises an ionosphere-free carrier phase combination at a second location of the mobile device. The one or more processing units are also configured to determine the second location of the mobile device at the second time based at least in part on the second GNSS measurement and the correction term.

An example device, according to this description, comprises means for obtaining a first GNSS measurement at a first time, wherein the first GNSS measurement comprises an ionosphere-free carrier phase combination at a first location of the mobile device, and means for generating a correction term based at least in part on the first GNSS measurement, and the first location. The device further comprises means for obtaining a second GNSS measurement at a second time, wherein the second GNSS measurement comprises an ionosphere-free carrier phase combination at a second location of the mobile device. The device also comprises means for determining the second location of the mobile device at the second time based at least in part on the second GNSS measurement and the correction term.

An example non-transitory computer-readable medium, according to this description, has instructions thereon for RTK positioning of a mobile device, wherein the instructions, when executed by one or more processing units, cause the one or more processing units to obtain a first GNSS measurement at a first time, wherein the first GNSS measurement comprises an ionosphere-free carrier phase combination at a first location of the mobile device, and generate a correction term based at least in part on the first GNSS measurement, and the first location. The instructions, when executed by the one or more processing units, further cause the one or more processing units to obtain a second GNSS measurement at a second time, wherein the second GNSS measurement comprises an ionosphere-free carrier phase combination at a second location of the mobile device. The instructions, when executed by the one or more processing units, also cause the one or more processing units to determine the location of the mobile device at the second time based at least in part on the second GNSS measurement and the correction term.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As used herein, the terms "position" and "location" are used interchangeably. Further, terms such as "position determination," "position fix," "location estimate," are also used interchangeably herein with regard to GNSS-based positioning to refer to an estimated position of a mobile device, rover station, or other device comprising a GNSS receiver.

Figure 1:
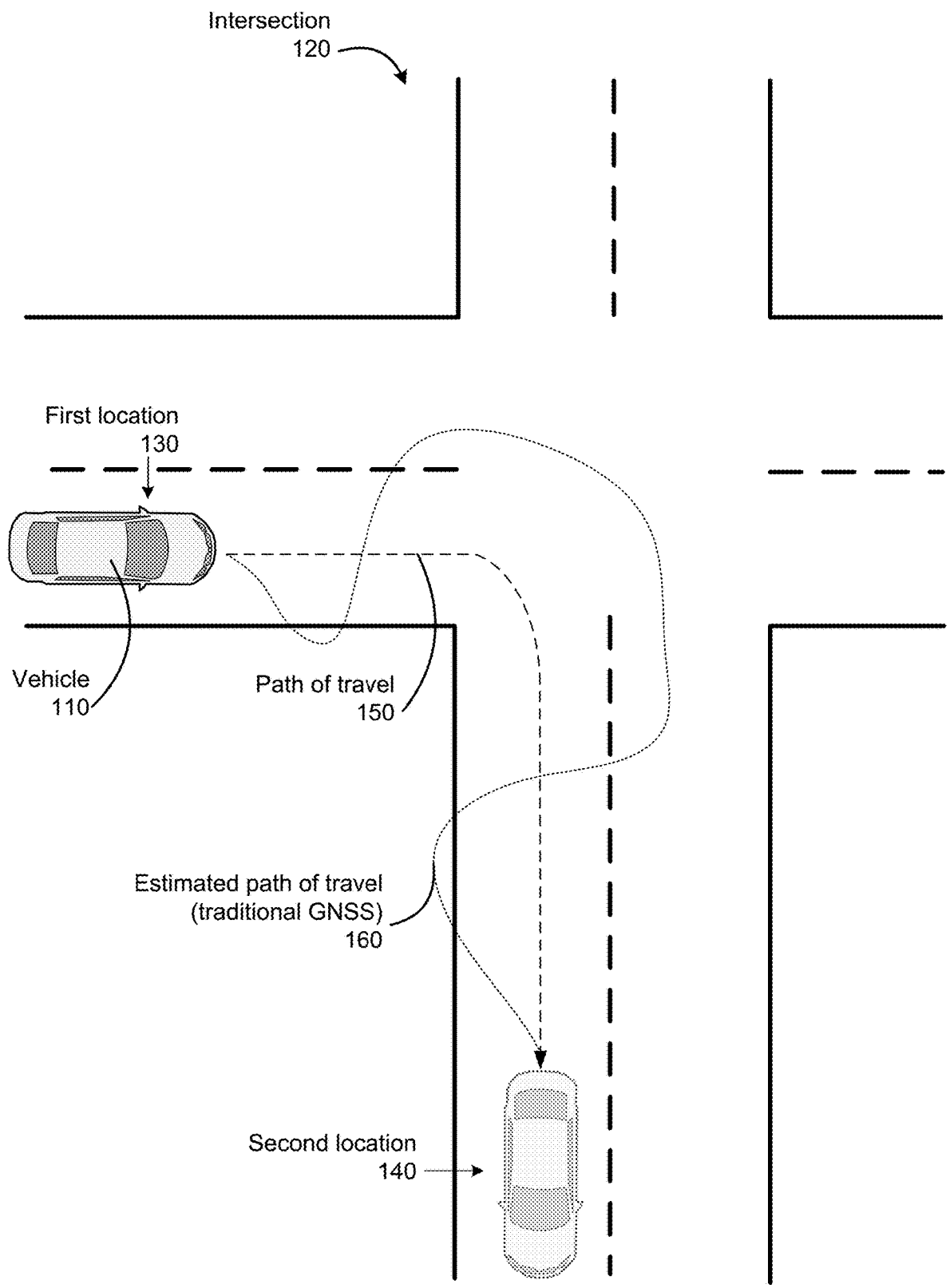
FIGS. 1 and 2 are illustrations of an overhead view of a vehicle traveling through an intersection.
Figure 2:
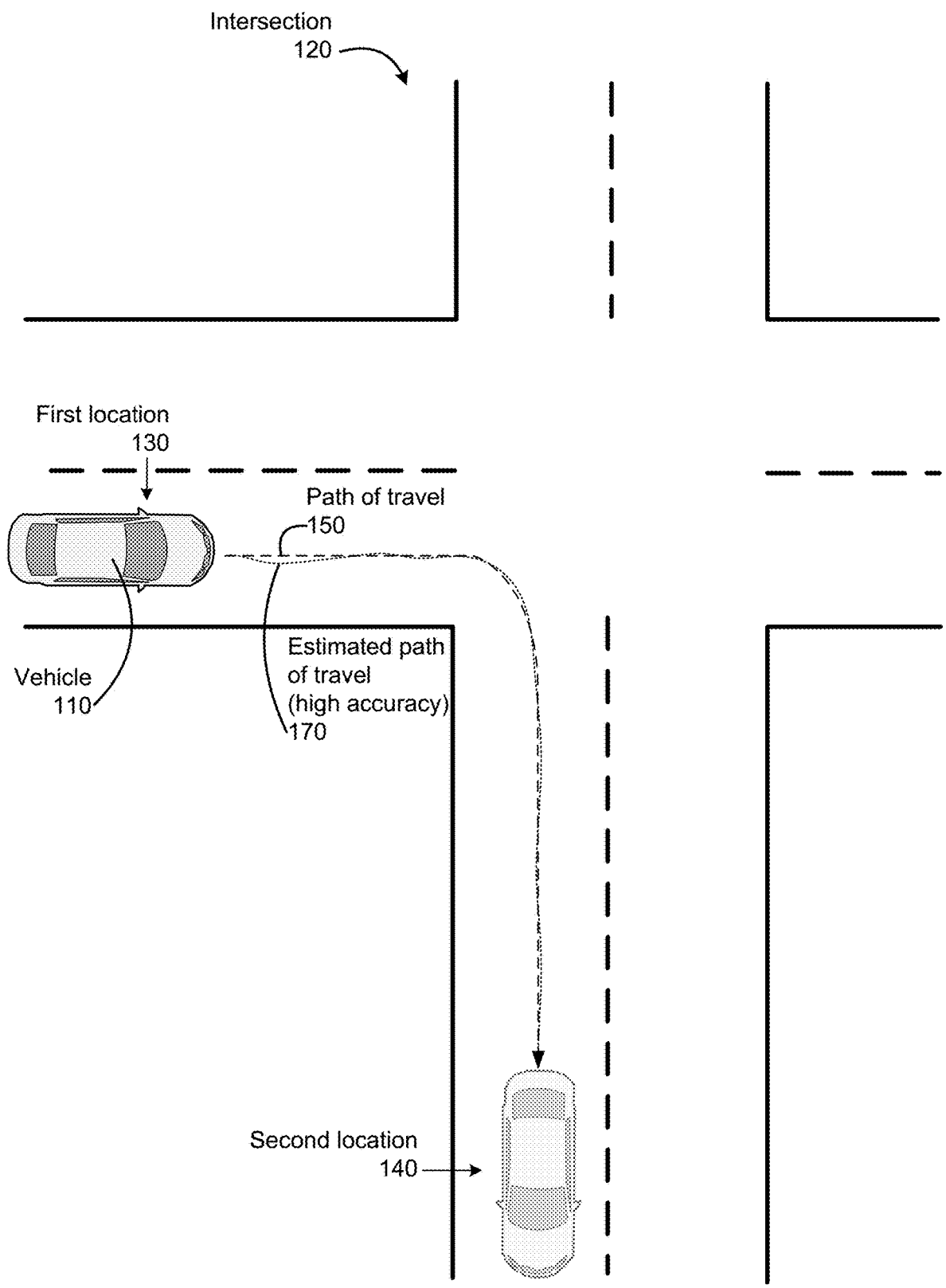

Highly-accurate location determination for consumer electronics can be important in a wide variety of applications. FIGS. 1 and 2 illustrate one such example: autonomous driving.

FIG. 1 is an illustration of an overhead view of a vehicle 110 traveling through an intersection 120. In this example, the vehicle 110 travels from a first location 130 to a second location 140 along a path of travel 150. The estimated path of travel 160 using traditional GNSS location determination techniques, however, would place the vehicle 110 in different lanes or even off the road. This is because the accuracy of traditional GNSS position determination can include an error of several meters. This can be insufficient for autonomous driving needs. Autonomous driving levels L2 or greater, for example, often require decimeter-level accuracy. This level of accuracy cannot be guaranteed by traditional GNSS alone. Although GNSS may sometimes provide a highly-accurate position at a given location, such accuracy cannot be guaranteed over the course of even a few seconds, especially if the vehicle is moving. An autonomous vehicle following the path of travel 150 in only a short travel distance could have been subject to multiple accidents.

FIG. 2 is an illustration of an overhead view of the same conditions as FIG. 1. However, rather than using traditional GNSS like the example in FIG. 1, RTK positioning with GNSS is used, resulting in a real-time, high-accuracy position that provides for an estimated path of travel 170 that is much more closely aligned to the actual path of travel 150. As can be seen, RTK positioning can result in position determinations within accuracy of decimeters or even centimeters, and therefore can be used in automated driving and other applications.

Figure 3:
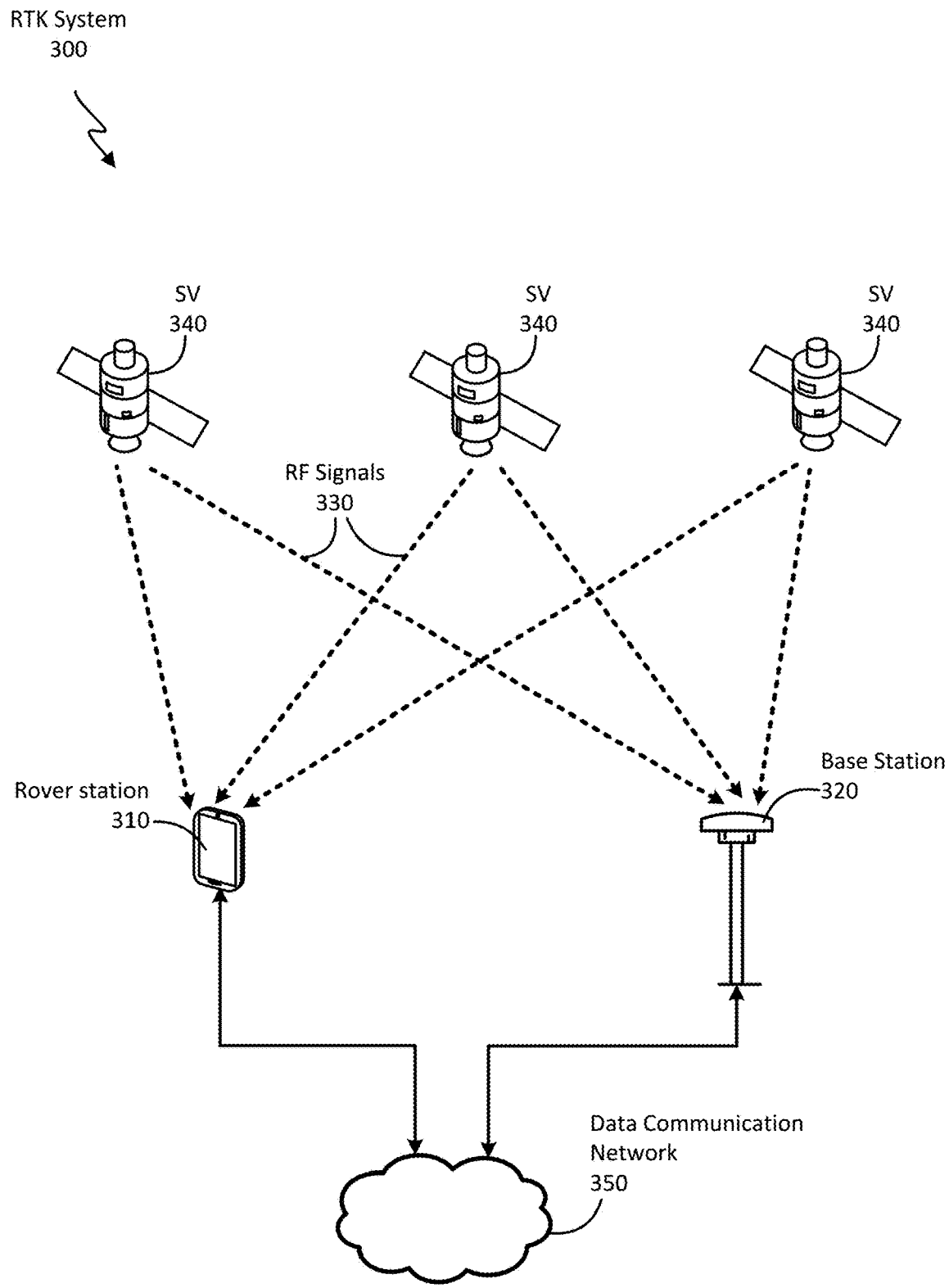
FIG. 3 is a simplified diagram of a traditional RTK system with a base station.

RTK positioning is a GNSS-based positioning technique that uses carrier-based ranging by determining the number of carrier cycles between a GNSS satellite and a rover station. RTK positioning may involve computations for the cancellation of various errors (e.g., satellite clock and orbit, ionospheric and tropospheric delays, phase wind-up, site displacement including solid earth tide, ocean loading, and/or pole tide) by means of differential corrections made using observations from a highly-accurate GNSS receiver at a reference location, and assuming the observations have effectively the same errors. As shown in FIG. 3, traditional RTK systems employ one or more "base stations" to determine these differential corrections. However, in traditional RTK, the RTK correction information supplied to the rover station (e.g., a mobile device) must be refreshed frequently in order to maintain accuracy. Traditionally, this refresh rate is typically once per second, and rarely more than a few seconds.

FIG. 3 is a simplified diagram of a traditional RTK system 300. As noted, the RTK system 300 enables a highly accurate GNSS position fix of the rover station 310 by using GNSS receivers at both the rover station 310 and base station 320 that receive RF signals 330 from satellite vehicles (SVs) 340 from one or more GNSS constellations (e.g., Global Position System (GPS), Galileo (GAL), global navigation Satellite System (GLONASS), Beidou, etc.). As previously noted, types of rover stations 310 used may vary, depending on application, and may include any of a variety of types of mobile devices having access to GNSS positioning data, such as mobile devices equipped with GNSS receivers. Such mobile devices may include, for example consumer electronics or other mobile consumer devices, such as a mobile phone, tablet, laptop, wearable device, vehicle, or the like.

To perform a traditional GNSS position fix, the rover station 310 can use code-based positioning to determine a distance of each of the SVs 340 based on a determined delay in a generated pseudorandom binary sequence received in the RF signals 330. The rover station 310 can further accurately calculate the location of each SV 340 at a specific moment in time using ephemeris (or navigation) data regarding the SVs 140. With the distance and location information of the SVs 140, the rover station 310 can then determine a position fix for its location. This position fix may be determined, for example, by a Standalone Positioning Engine (SPE) executed by one or more processors of the rover station 310. However, the resulting accuracy of the position fix for the rover station 310 is subject to errors caused by SV 340 orbit and clock, ionosphere and troposphere delays, and other phenomena. As shown in FIG. 1, this can provide an accuracy on the order of meters, which may be less than desirable for many applications.

Traditional RTK positioning can provide a high-accuracy solution by using carrier-based ranging based on the carrier wave of the RF signals 330 and using the base station 320 to make similar observations from a reference location that can be used to make differential corrections of errors from various error sources. The base station 320 comprises a fixed GNSS receiver that, using carrier-based ranging and known position, provides RTK measurement information (also known as "RTK service data") that is communicated to the rover station 310 via, for example, a data communication network 350 and used by the rover station 310 as corrective information to reduce the errors as described above (e.g., orbit and clock errors, ionosphere and troposphere delays, etc.) by comparing the RTK measurement information with measurements of the SVs 340 made by the rover station 310 to determine an accurate position fix for the rover station 310. This position fix may be determined, for example, by a Precise Positioning Engine (PPE) executed by one or more processors of the rover station 310. More specifically, in addition to the information provided to and SPE, the PPE may use RTK measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP).

As noted, to maintain accuracy of the position fix for the rover station 310, the rover station 310 may need to frequently receive updated RTK measurement information from the base station 320. For example, the RTK measurement information may be provided to the rover station 310 once every second. This can be problematic for at least three reasons. First, at any given time there may be many rover stations 310 (e.g., dozens, hundreds, thousands, or more), and thus, the RTK system 300 may consume the base station's 320 bandwidth for positioning overhead data rather than carrying user data for the data communication network 350. Second, RTK services often require payment each time RTK measurement information is provided to a rover station 310. Thus, acquiring and maintaining a high-accuracy position fix for the rover station 310 can be costly over time. Third, the rover station 310 loses its ability to make highly-accurate RTK position estimates in case of a data outage resulting in an inability to provide the rover station 310 with RTK measurement information.

According to embodiments provided herein, RTK measurement information and subsequent differential error correction can be derived from measurements taken by the rover station 310 itself, rather than a base station 320. That is, by leveraging measurements taken by the rover station 310 at an initial location (e.g., first location 130 of FIG. 2) for which the position fix is highly accurate (which may be based on RTK measurement information from a base station 320), differential corrections can be applied subsequently to maintain highly accurate position estimates (e.g., estimated path of travel 170) for the rover station 310 over an extended period of time, without requiring additional RTK measurement information from the base station 320. Among other advantages, this can significantly reduce the amount of network bandwidth and cost. In some embodiments, for example, rather than receiving RTK measurement information every second, the rover station 310 can go 1200 seconds (20 minutes) or more without the need for additional RTK measurement information. Depending on desired functionality, some embodiments may obtain RTK measurements at additional or alternative intervals (every 10, 15, 25, or 30 minutes, for example). (Additional information in this regard is provided herein in reference to FIGS. 5A and 5B.) In these embodiments, the rover station 310 can effectively generate and use its own RTK correction, such as by leveraging the ionosphere-free carrier phase combination from measurements taken with MCMF GNSS receivers.

Figure 4:
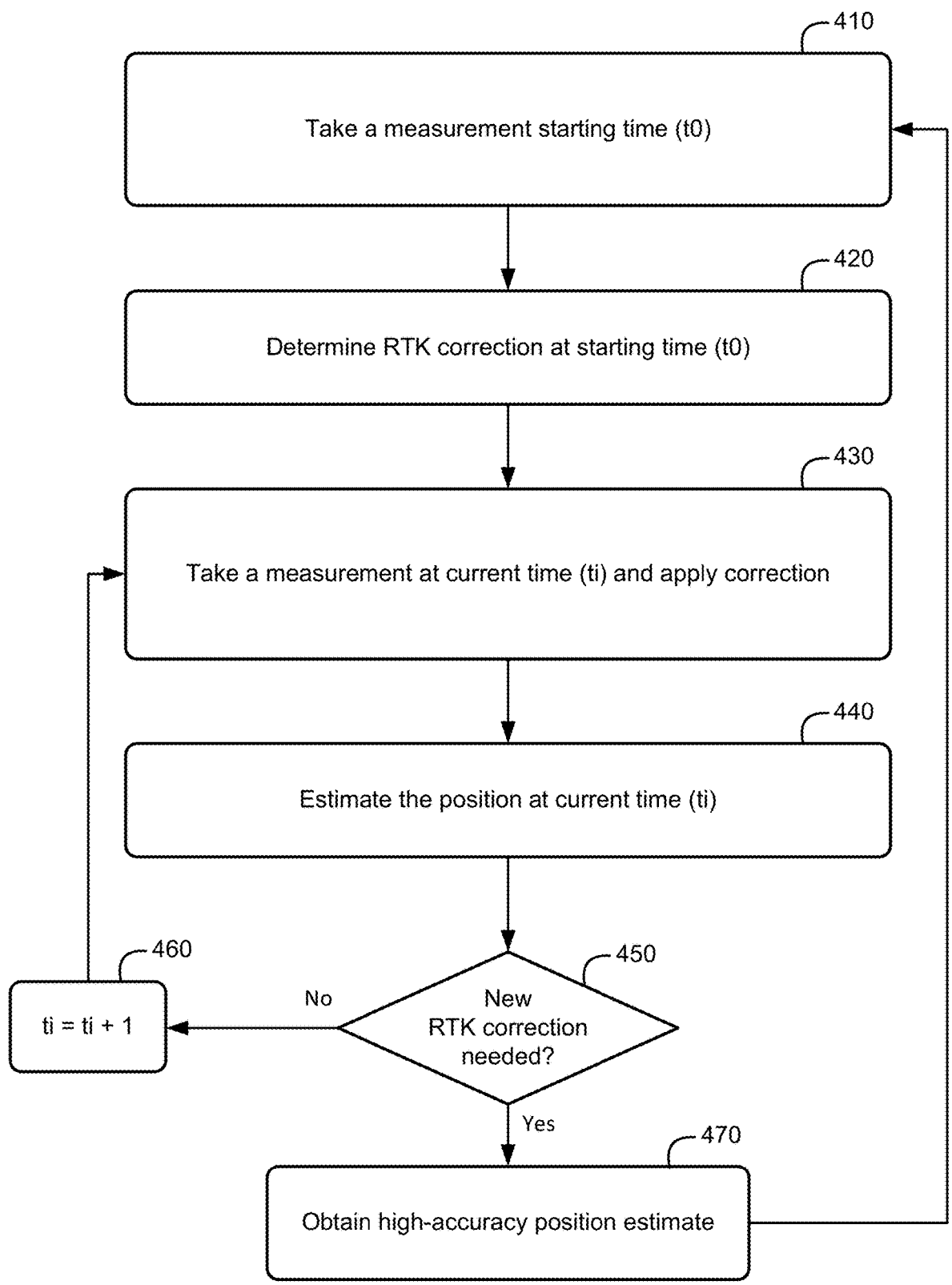
FIG. 4 is a flowchart of an embodiment of a method for applying RTK GNSS corrections without using RTK base stations.
Figure 8:
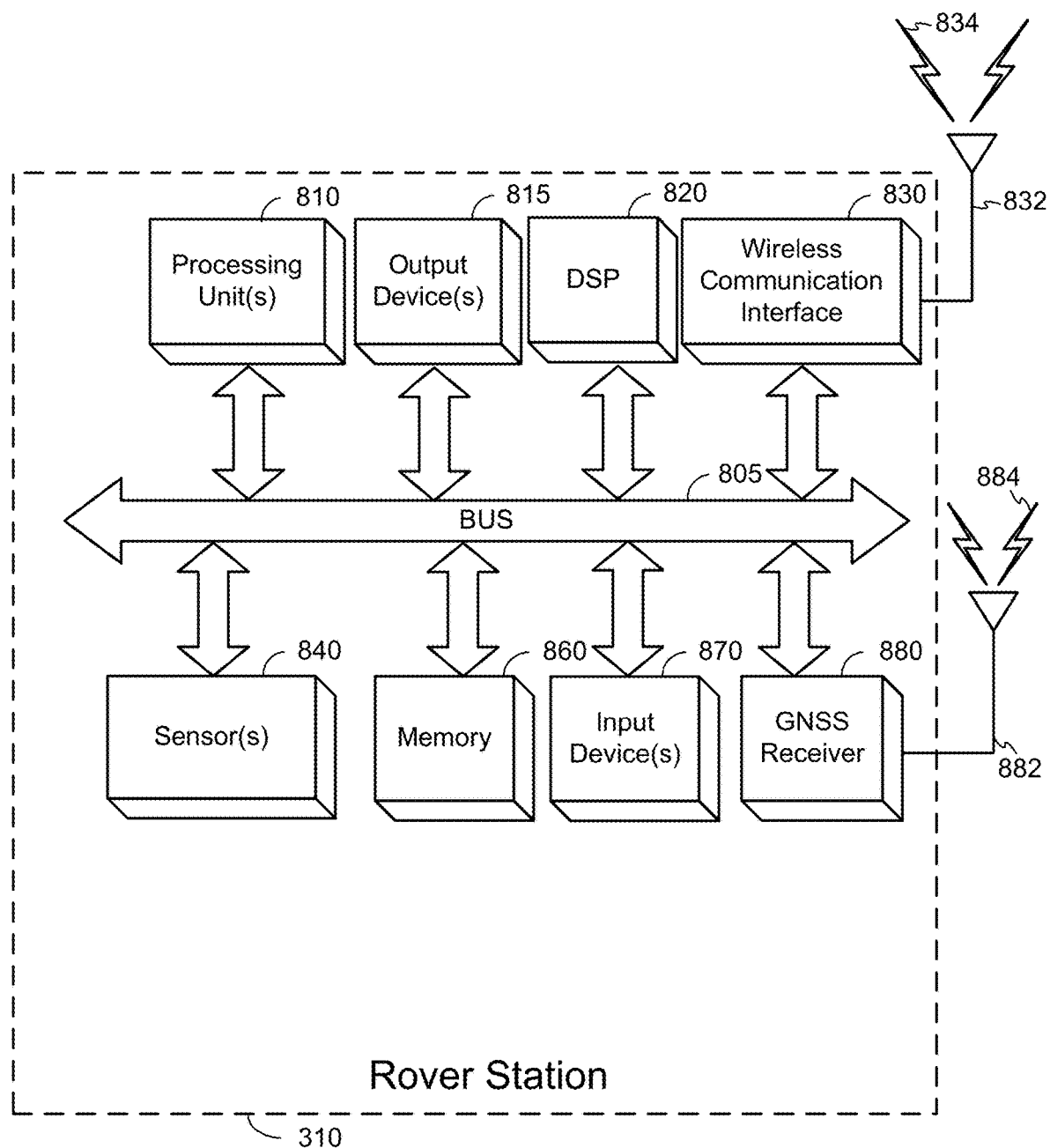
FIG. 8 is a block diagram of various hardware and software components of a rover station, according to an embodiment.

FIG. 4 is a flowchart of an embodiment of a method for applying RTK GNSS corrections without using base stations, in which functions are described mathematically. The functionality in each of the blocks illustrated in FIG. 4 may be performed by hardware and/or software components of a rover station 310. (Example hardware and software components of a rover station 310 are illustrated in FIG. 8 and described in more detail below.) It can be noted that, although the embodiment shown in FIG. 4 and described below includes specific terms and equations, alternative embodiments may use alternative terms and/or equations.

At block an 410 initial measurement is taken at a starting time, to. The techniques provided herein for high-accuracy location estimation for the rover station 310 are aided by a highly-accurate initial location estimate. Accuracy may be maintained relative to the accuracy of the initial location estimate. Thus, the rover station 310 may perform the functionality at block 410 after an accurate initial location estimate has been made. This initial location estimate can be based, for example, on RTK positioning data after convergence/ambiguity fixing. (Other applications may not need convergence/ambiguity fixing if, rather than absolute position accuracy, position accuracy subsequent to time t0 relative to the position at time t0 is desired.) The rover station 310 does not need to be static at starting time to, and may be moving.

The measurement at the starting time (t0) (shown in block 410) can be represented as:

$$\nabla \Phi_{IF,t0} = (\nabla \rho_{IF,t0} + \nabla LOS_{t0} * dXt_0)(\nabla Trop_{IF,t0} + \nabla MAP_{t0} * dWet_{t0}) + \nabla dSat_{t0} + \nabla N_{IF,t0}, \quad (1)$$

where equation variables are defined as follows:
$\nabla$—Between-satellite single-differencing operator
$\Phi_{IF}$—Ionosphere-free carrier phase combination (e.g., from combinations of GPS L1, L2, and L5 carriers; GAL E1, E5A, E5B, and E6 carriers; and/or BDS B1I, B1C, B2A, B2B, and B3 carriers)
$\rho$—Calculated geometry range
LOS—Satellite line-of-sight vector
dX—Position error to be estimated
Trop—Calculated troposphere delay using models
MAP—Troposphere wet component mapping function
Wet—Troposphere wet zenith delay error to be estimated
Sat—Satellite orbit and clock combined error
N—Ambiguity term for ionosphere-free carrier phase combination.

In this embodiment, ionosphere errors may not need to be accounted for in equation (1) because ionosphere errors can be reduced using the ionosphere cancellation functionality of an MCMF GNSS receiver at the rover station 310. More specifically, when GNSS signals pass through the ionosphere layers, ionospheric refraction will occur. However, the first order impact (99.9%) of errors arising from this refraction is inversely proportional to the square of the signal frequency. Therefore when at least two signals with different frequencies from the same satellite are available, this first order impact can be eliminated in MCMF receivers that can detect these signals by taking a measurement that uses a linear combination of the signals, namely ionosphere-free carrier phase combination, $\Phi_{IF}$. (A similar ionosphere-free combination is valid for pseudorange measurements.) In this manner, an MCMF GNSS receiver can take a measurement of a plurality of RF signals 330 transmitted on different frequencies (e.g., GPS L1 and L5 frequencies, GAL E1 and E5A frequencies, BDS B1I and B2A frequencies, etc.) that accounts for ionospheric delay. That said, alternative embodiments may utilize receivers that do not provide ionosphere-free observations in this matter, and may instead account for ionosphere-related errors by estimating ionosphere delays at starting time t0 and subsequently at time ti.

At block 420 a RTK correction term is determined that corresponds to the starting time (t0). The rover station 310 can derive an RTK correction term for use in maintaining high-accuracy positioning based on the measurement of block 410 at the starting time t0. As shown in block 420 the RTK correction term at the starting time (t0) can be represented as:

$$\nabla Corr_{IF,t0} = \nabla LOS_{t0} * dX_{t0} + \nabla MAP_{t0} * dWet_{t0} + \nabla dSat_{t0} + \nabla N_{IF,t0} \quad (2)$$

At block 430 The rover station 310 can subsequently take a measurement at a "current time" (ti), which can be represented as:

$$\nabla \Phi_{IF,ti} = (\nabla \rho_{IF,ti} + \nabla LOS_{ti} * dX_{ti}) + (\nabla Trop_{IF,ti} + \nabla MAP_{ti} * dWet_{ti}) + \nabla dSat_{ti} + \nabla N_{IF,ti}. \quad (3)$$

The rover station 310 can then apply the correction to the measurement of block 430 by differentiating the terms in equations (2) and (3). The location at the current time, ti, is relative to the location at the starting time t0 (which may occur after convergence/ambiguity fixing), and thus, the same ambiguity term can be used for both equations (2) and (3). Thus $\nabla N_{IF,ti} = \nabla N_{IF,t0}$. Because of this, and because $\nabla dSat_{ti} \approx \nabla dSat_{t0}$, the resulting measurement at current time ti, after correction is applied, can be represented as follows:

$$\nabla \Phi_{IF,ti} = \nabla \rho_{IF,ti} + \nabla LOS_{ti} * (dX_{ti} - dX_{t0}) + \quad (4)$$
$$(\nabla LOS_{ti} - \nabla LOS_{t0}) * dX_{t0} + \nabla Trop_{IF,ti} +$$
$$\nabla MAP_{ti} * (dWet_{ti} - dWet_{t0}) + (\nabla MAP_{ti} - \nabla MAP_{t0}) * dWet_{t0}$$

as illustrated at block 440 of FIG. 4.

With this corrected measurement of equation (4), the location of the rover station 310 is estimated by a location/position estimator in accordance with GNSS positioning techniques. The location/position estimator may be part of a positioning engine (e.g., a PPE), and may use estimation techniques such as by using an Extended Kalman Filter (EKF), Weighted Least Squares (WLS), a hatch filter, particle filter, or the like. That is, a location/position estimator can be used to estimate the position of the rover station 310 at the current time ti, relative to the position of the rover station 310 at starting time t0:

$$(dX_{ti} - dX_{t0}). \quad (5)$$

At block 450 the rover station 310 determines whether new RTK correction is needed. If not, the method can proceed to block 460, where time advances (ti=ti+1) and the operations shown in blocks 430-460 can continue to repeat until it is determined that new RTK correction is needed, at which point the process include obtaining a new, high-accuracy position estimate, as shown in block 470. This high-accuracy position estimate can be used as a new reference point, and the process can begin again at block 410. The determination of whether new RTK correction is needed, at block 450, can be based on any of a variety of factors and is discussed in more detail below. According to some embodiments, the frequency at which new measurements and position estimates are made (e.g., the frequency at which the functionality shown in blocks 430-460 repeats) can match the frequency at which traditional RTK measurement information is retrieved (e.g., once per second). Other embodiments may perform this functionality at a higher or lower frequency, depending on desired functionality. It also can be noted that embodiments may implement the process illustrated in FIG. 4 differently. For example, according to some embodiments, the measurement taken at starting time t0 (shown at block 410) may be made to obtain an initial high-accurate position estimate, rather than taken afterward.

Figure 5A:
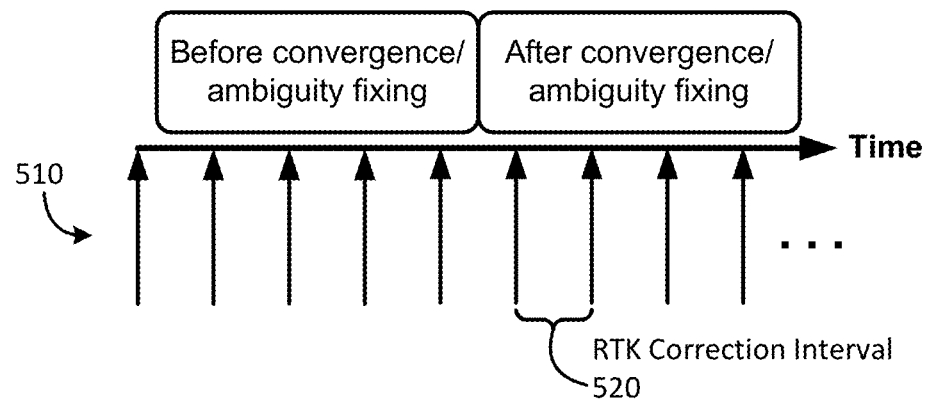
FIG. 5A is an illustration of a timeline representing points in time at which RTK measurement information is received by a rover station from a base station, according to traditional RTK position estimate techniques.
Figure 5B:
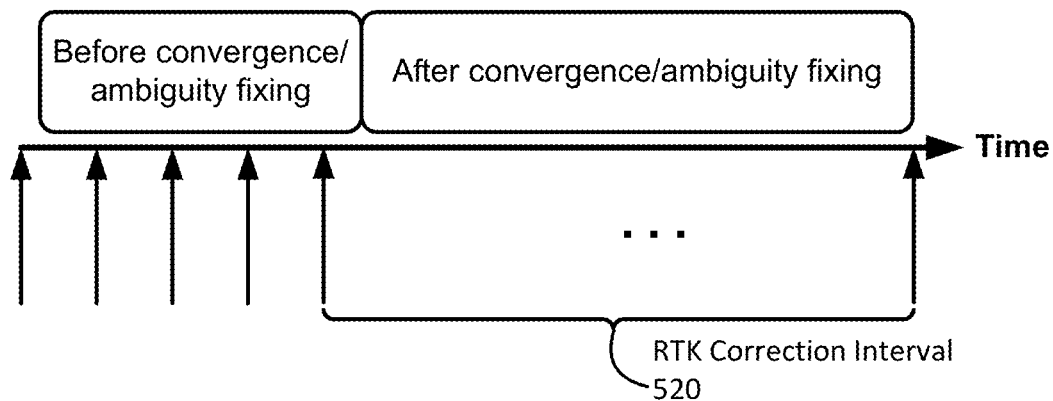
FIG. 5B is an illustration of a timeline, similar to FIG. 5A, but showing how the RTK correction interval may be extended significantly using the embodiments provided herein.

By calculating its own correction term, the rover station 310 can maintain a high degree of accuracy for long periods of time after convergence (e.g., repeating the functionality shown in blocks 430-460) without the need for RTK measurement information from a base station or other means of high-accuracy position estimation (which may be performed at block 470). FIGS. 5A and 5B are illustrations that help relay this concept visually.

FIG. 5A is an illustration of a timeline representing points in time at which RTK measurement information, such as RTK service data, is received by a rover station 310 from a base station 320, according to traditional RTK position estimate techniques. These point in time are represented by arrows 510. Also illustrated are the times before convergence/ambiguity fixing and after convergence/ambiguity fixing. The border between these times represents a time at which the ambiguity term (e.g., term N in equation (1)) is determined. As a person of ordinary skill in the art will appreciate, the determination of the ambiguity term, which represents ambiguity (integer number) of the carrier phase, allows for the carrier-based ranging, resulting a high-accuracy estimate for the rover station 310. That is, the period of time after convergence/ambiguity fixing is a time during which a high-accuracy RTK position estimate is maintained by continuing to receive RTK measurement information from the base station 320. As can be seen, the periodicity at which RTK measurement information is received from the base station 320, labeled RTK correction interval 520, is the same both before and after convergence. Traditionally, the RTK correction interval 520 is one second.

FIG. 5B is an illustration of a timeline, similar to FIG. 5A, but showing how the RTK correction interval 520 may be extended significantly using the embodiments provided herein, such as the method illustrated in FIG. 4. That is, for embodiments that utilize RTK measurement information received from a base station 320 to determine an initial, high-accuracy position estimation, the receipt of RTK measurement information before convergence/ambiguity fixing may proceed as normal, having a standard RTK correction interval 520 for determination of the initial position estimation. However, once the initial position estimation occurs after convergence/ambiguity fixing, additional RTK correction information is not needed for some time, thereby extending the RTK correction interval 520 significantly. In some embodiments, additional RTK measurement information may be received after convergence/ambiguity fixing before increasing the RTK correction interval 520.

Figure 6:
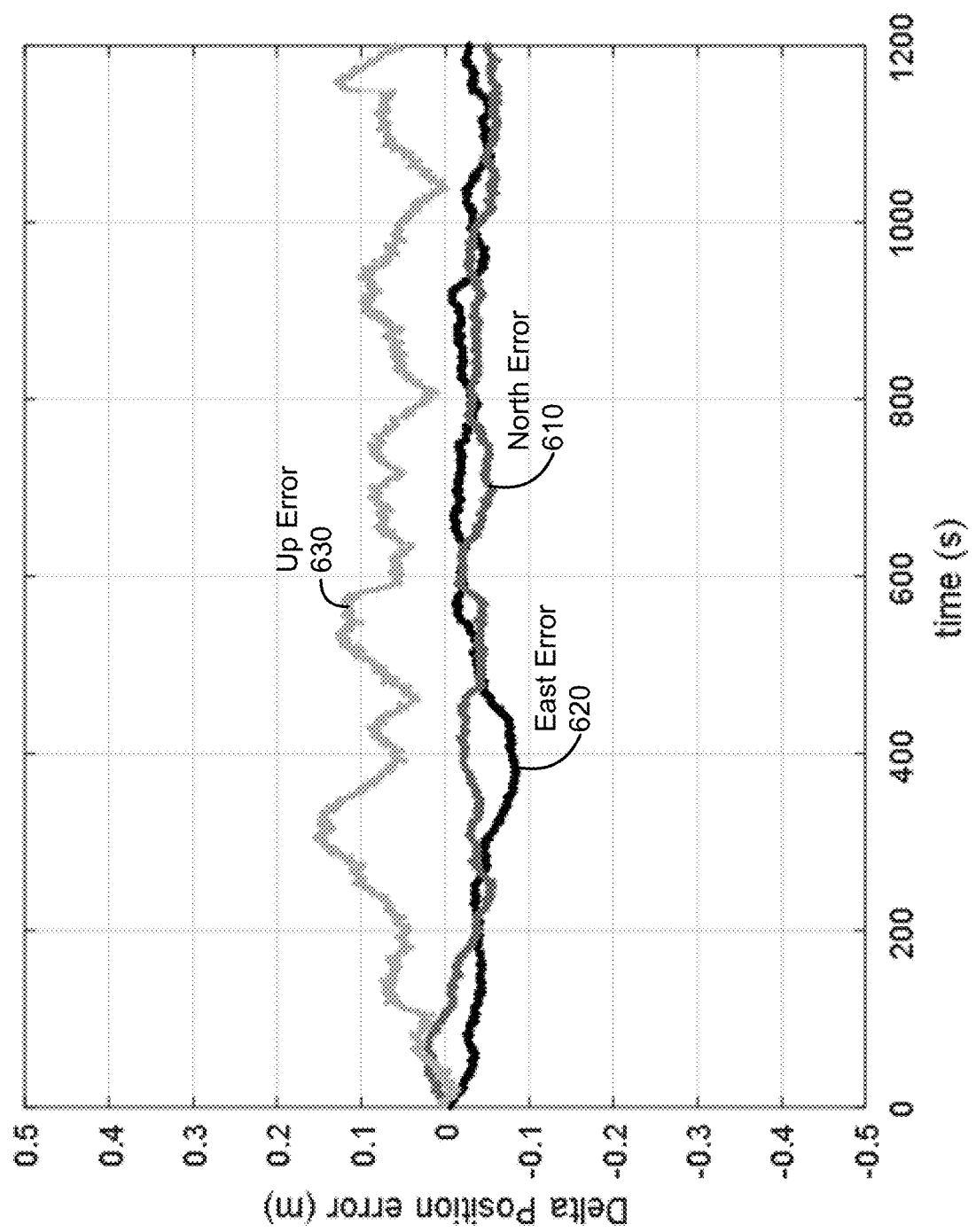
FIG. 6 is a graph of simulated results in which the position error relative to an initial position (at time 0) is plotted over time.

FIG. 6, for example, is a graph of simulated results in which the position error relative to an initial position (at time 0) is plotted over time. The simulation extended 1200 seconds (20 minutes) in which the rover station 310 used its own RTK correction, without the use of RTK measurement information from a base station 320. The North error 610 remains below approximately 0.5 dm, the East error 620 remains below 1 dm, and the Up error 630 remains below approximately 1.5 dm. Thus, the accuracy is significantly improved over traditional GNSS (e.g., as shown in FIG. 1), and can be equal to or similar to the accuracy provided in traditional RTK positioning environments using RTK measurement information from a base station in the manner shown in FIG. 5A. Thus, the accuracy is significantly improved over traditional GNSS (e.g., as shown in FIG. 1), and can be equal to or similar to the accuracy provided in traditional RTK positioning environments using RTK measurement information from a base station in the manner shown in FIG. 5A. Thus, the embodiments provided herein can be used in high-accuracy applications, such as autonomous driving (e.g., as shown in FIG. 2), but provide the high-accuracy without consuming bandwidth within the base station's limited resources and provide the high-accuracy with better resiliency by not relying on the base station's communications.

The significant increase of the RTK correction interval 520 after convergence/ambiguity fixing (e.g., by a factor of 1200 in the example shown in the simulation results of FIG. 6) enabled by the embodiments described herein, provides various advantages over traditional RTK positioning. The significant reduction in bandwidth, for example, can allow an RTK system 300 to provide RTK measurement information to far more rover stations 310 using the same or less bandwidth. This can also mean significantly reduced operational costs of the rover station 310 if payment for RTK measurement information from a base station 320 is required. Techniques may also be utilized where there is a data outage in an RTK system 300 that would prevent communication of the RTK measurement information from the base station 320 to the rover stations 310.

Again, although traditional RTK measurement information from a base station 320 may be used to determine an initial, high-accuracy position estimate (as illustrated in FIG. 5B), this initial position estimate does not need to be an RTK position estimate. That is, the initial position estimate may be made using techniques in addition or alternative to RTK positioning. Precise Point Positioning (PPP), for example, which uses a network of global base stations to determine GNSS satellite orbit and clock corrections providing high-accuracy position estimates of a rover station 310, may be used.

In some embodiments, additional corrections may be obtained to extend the RTK correction interval 520 after convergence/ambiguity fixing, without the need for a new high-accuracy position estimate or additional RTK measurements from a base station. That is, in reference to FIG. 4, corrections may be applied at block 430 (to corrected measurement of equation (4)) to extend the length of time the functions in blocks 430-460 can repeat before new RTK correction is needed at block 450.

For example, one correction that may be used to extend the RTK correction may be a correction for orbital clock error, $\nabla dSat$. Over an extended period of time (e.g., a long RTK correction interval 520) the approximation for orbital clock error ($\nabla dSat_n \approx \nabla dSat_{t0}$) may cause the corrected measurement (equation (4)) to become inaccurate over time. Thus, according to some embodiments, a mobile device may extend the RTK correction interval 520 by obtaining orbital clock error correction from Space-Based Augmentation System (SBAS) and/or other sources. By extending the RTK correction interval in this manner, embodiments can further reduce the need for RTK measurement information from a base station 320. Similarly, correction may be made to additional or alternative errors accounted for in the corrected measurement (equation (4)), which may be provided by other sources, including other rover stations 310 (e.g., via peer-to-peer (P2P) communication), Internet of Things (IoT) devices, cellular devices (e.g., via Long Term Evolution (LTE), Fifth-Generation New Radio (5G NR)), etc. Additionally or alternatively, embodiments may further conduct a between-satellite single difference so that no further consideration is required for receiver clock, GNSS inter/intra frequency and constellation biases, and/or receiver phase center variation effect. In some embodiments, a rover station 310 may have a setting enabling a user or application to extend the RTK correction interval 520 using these types of error correction techniques.

Returning to the functionality of block 450 in FIG. 4, the determination of whether new RTK correction is needed may be made using any of a variety of techniques. In some embodiments, a timer may be set so that the correction interval 520 does not exceed a certain amount of time. In some embodiments, this may be based on whether additional correction information is received, the accuracy requirements, and/or other factors. For example, orbital clock error ($\nabla dSat$) may be assumed to increase by a certain amount over a certain period of time. Given the accuracy requirements of a particular application, embodiments may therefore determine whether new RTK correction is needed based on a threshold amount of time. If accuracy requirements for a given application require the accuracy of a position estimate for the rover station 310 to be within 15 cm, and the orbital clock error is assumed to increase a maximum of 5 cm every five minutes, then it may be determined (at block 450 of FIG. 4) that new RTK correction is needed if 15 minutes have passed since the initial position estimate.

Additionally or alternatively, the determination of whether new RTK correction is needed may be based on whether a position error estimate exceeds a certain threshold. Horizontal Estimated Position Error (HEPE), for example, is an accuracy value generated by a position determination engine of a rover station 310. Some embodiments may therefore determine that new RTK correction is needed (at block 450 of FIG. 4), if a HEPE value exceeds a certain accuracy threshold. Again, this value may be application dependent. Thus, for example, if an application requires an accuracy of less than 20 cm, new RTK correction may be obtained if the HEPE value is 20 cm or greater.

Additionally or alternatively, embodiments may employ other factors in the determination of whether new RTK correction is needed. Environmental factors may be taken into account. For example, high-traffic environments in autonomous vehicle applications, for example, may require a higher degree of accuracy than low-traffic environments. The availability and/or accuracy of other sensors may additionally or alternatively be taken into account. For example, if a camera or LIDAR of an autonomous vehicle is impaired or unavailable, a higher degree of accuracy may be required. As such, a time threshold and/or accuracy threshold may be reduced to help ensure new RTK correction is obtained in a way that maintains highly-accurate RTK position estimation.

Figure 7:
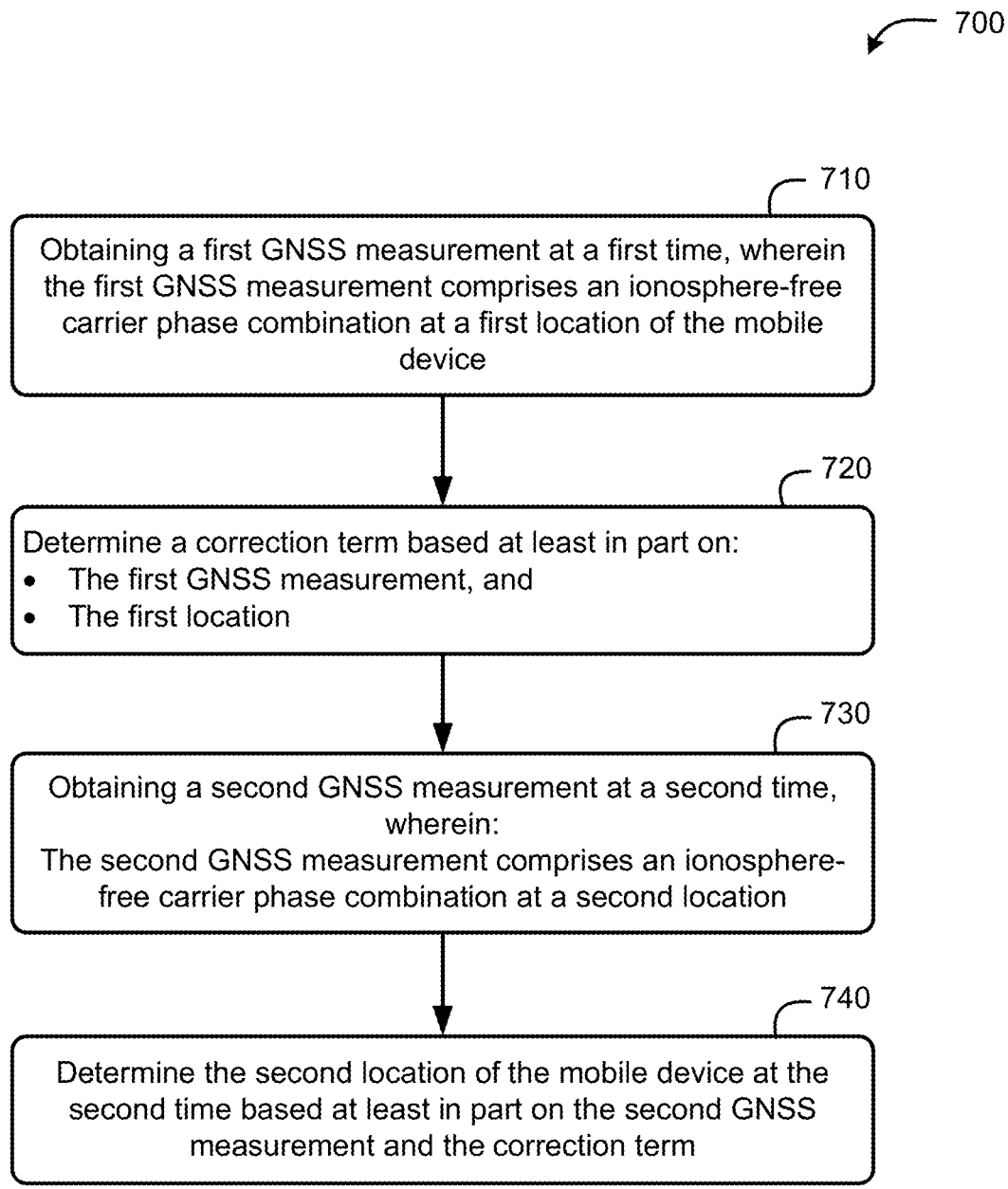
FIG. 7 is a flow diagram of a method of RTK positioning of a mobile device, according to an embodiment.

FIG. 7 is a flow diagram of a method 700 of RTK positioning of a mobile device, according to an embodiment. The method 700 can utilize the techniques described above, and therefore may be seen as an implementation of the previously-described process, illustrated in FIG. 4. Alternative embodiments may vary in function by combining, separating, or otherwise varying the functionality described in the blocks illustrated in FIG. 7. Here, the mobile device may comprise a rover station 310, as used in the above-described embodiments. As such, means for performing the functionality of one or more of the blocks illustrated in FIG.

7 may comprise hardware and/or software components of a rover station 310, such as the components shown in FIG. 8 and described herein below.

At block 710, the functionality comprises obtaining a first GNSS measurement at a first time, wherein the first GNSS measurement comprises an ionosphere-free carrier phase combination at a first location of the mobile device. As previously noted, an ionosphere-free carrier phase combination may be obtained using combinations of two or more frequencies, including (but not limited to) GPS L1, L2, and /L5 carriers; GAL E1, E5A, E5B, and E6 carriers; and/or BDS B1I, B1C, B2A, B2B, and B3 carriers. Additionally, as illustrated in the example of equation (1), this first measurement may comprise a variety of variables that can be used for generating a correction term. As noted, subsequent location determinations are relative to this initial location. Thus, some embodiments may further include determining a high-accuracy location determination for this first location. This can include using RTK positioning based on information received from a base station. That is, in some embodiments, the method 700 further comprises determining the first location-based at least in part on RTK measurement information received from a base station. That said, other forms of high-accuracy location determination, such as PPP, may be used.

Means for performing the functionality at block 710 may include one or more software and/or hardware components of a rover station 310, such as a bus 805, processing unit(s) 810, wireless communication interface 830, memory 860, GNSS receiver 880, and/or other software and/or hardware components of a rover station 310 as illustrated in FIG. 8 and described in more detail below.

At block 720, the functionality comprises determining an correction term based at least in part on the first GNSS measurement and the first location. As previously described with regard to equation (2) and the functionality at block 420 of FIG. 4, this correction term can include variables from the ionosphere-free carrier phase combination used for differential correction of subsequent ionosphere-free carrier phase combinations. It can be noted that an correction term may not be generated explicitly. Instead, it may be generated implicitly when at least some portions of the ionosphere-free carrier phase combination taken at the first time are for differential correction of ionosphere-free carrier phase combinations taken at subsequent times. Referring to FIG. 4, for example, rather than taking a two-step approach of (1) explicitly generating an correction term at block 420 and (2) applying it to a subsequent measurement at block 430, embodiments may implicitly use an correction term by taking a one-step approach that applies measurements taken at the subsequent time ti in a manner that that generates and applies correction terms in a single step (combining the functionality of blocks 420 and 430).

Means for performing the functionality at block 720 may include one or more software and/or hardware components of a rover station 310, such as a bus 805, processing unit(s) 810, memory 860, and/or other software and/or hardware components illustrated in FIG. 8 and described in more detail below.

The functionality at block 730 comprises obtaining a second GNSS measurement at a second time, wherein the second GNSS measurement comprises an ionosphere-free carrier phase combination at a second location of the mobile device. As a person of ordinary skill in the art will appreciate, the ambiguity term, N, can be resolved at the first location (e.g., at or before the first time) to determine an accurate location estimate. And once resolved, they can allow for subsequent accurate location estimation. And thus, in some instances, the ionosphere-free carrier phase combinations for the first GNSS measurement and the second GNSS measurement may have the same ambiguity term. In other instances, the terms may be similar (having values of within 10%, 20%, or 30%, for example), but not necessarily the same. The resolving of the ambiguity term can allow for the convergence shown in FIGS. 5A and 5B.

Means for performing the functionality at block 730 may include one or more software and/or hardware components of a rover station 310, such as a bus 805, processing unit(s) 810, wireless communication interface 830, memory 860, GNSS receiver 880, and/or other software and/or hardware components illustrated in FIG. 8 and described in more detail below.

At block 740, the functionality comprises determining the second location of the mobile device at the second time based at least in part on the second GNSS measurement and the correction term. As shown in FIG. 4, this process can involve applying the correction term to the ionosphere-free carrier phase combination of the second GNSS measurement (e.g., as shown by equations (2)-(4) above and the functionality of block 430), and using a location/position estimator (e.g., EKF, WLS, hatch filter, or particle filter) to estimate the location of the mobile device.

Means for performing the functionality at block 740 may include one or more software and/or hardware components of a rover station 310, such as a bus 805, processing unit(s) 810, memory 860, and/or other software and/or hardware components illustrated in FIG. 8 and described in more detail below.

As noted, embodiments may employ additional techniques for obtaining and applying corrections from sources other than an RTK service. For example, in some embodiments, the method 700 may further comprise conducting a between-satellite single difference to obtain one or more corrections for one or more errors related to receiver clock, GNSS inter/intra frequency and constellation biases, or receiver phase center variation effect, or any combination thereof. In such instances, generating the correction term may be further based at least in part on the one or more corrections. Additionally or alternatively, the method 700 may further comprise obtaining correction data from a source that is not an RTK service, where the correction data comprises data enabling orbital correction, clock correction, or both (e.g., satellite orbit and clock combined error), and generating the correction term may be further based at least in part on the correction data. Specifically, the correction data may comprise data indicative of a satellite and/or clock changes from the first time (e.g., t0) to the second time (e.g., ti). As previously noted, the source that is not an RTK service may comprise another mobile device, IoT device, or other device capable of relaying the correction data to the mobile device. In some embodiments, the correction data may originate from an SBAS service.

As illustrated in the functionality shown in block 450 of FIG. 4, embodiments may further determine whether new RTK correction is needed before applying the correction term to subsequent measurements. Accordingly, according to some embodiments, the method 700 may further comprise determining whether a Horizontal Estimated Position Error (HEPE) value exceeds a threshold value at a third time, and, responsive to determining that the HEPE value exceeds the threshold value (1) requesting RTK measurement information from a base station and (2) determining a location of the mobile device using the RTK measurement information. As indicated previously, embodiments additionally or alternatively may employ similar functionality using a time threshold and/or distance threshold. That is, according to some embodiments, the method 700 may further comprise determining whether a threshold amount of time has passed since the first time, and, responsive to determining that the threshold amount of time has passed since the first time (1) requesting RTK measurement information from a base station and (2) determining a location of the mobile device using the RTK measurement information. Additionally or alternatively, the method 700 may further comprise determining whether the mobile device has moved a threshold distance since the first time, and, responsive to determining that the mobile device has moved the threshold distance since the first time (1) requesting RTK measurement information from a base station and (2) determining a location of the mobile device using the RTK measurement information.

Further, as indicated in the loop of functionality shown by blocks 430-460 of FIG. 4, the RTK correction may be applied repeatedly to subsequent measurements. Accordingly, some embodiments of the method 700 may further include, for each additional time of one or more additional times subsequent to the second time, taking a new respective GNSS measurement at the respective additional time, wherein the new respective GNSS measurement comprises an ionosphere-free carrier phase combination, and the ionosphere-free carrier phase combinations for the first GNSS measurement and the new respective GNSS measurement have the same ambiguity term. The location of the mobile device at the respective additional time may then be determined based at least in part on the new respective GNSS measurement and the RTK correction term.

As previously noted, the use of a correction term as described herein can be beneficial in the case of an outage of RTK measurement data. According to some embodiments, the functionality may be responsive to a determination that RTK measurement information is unavailable. This determination can be made, for example, by the mobile device and may be based on an explicit indication sent to the mobile device (e.g., an RTK service provider) indicating the unavailability of RTK measurement information. Additionally or alternatively, this determination may be based on the mobile device's failure to receive expected or requested RTK measurement information from an RTK service provider. (Some embodiments may implement a threshold amount of failed attempts/requests before determining the unavailability of RTK measurement information.)

Depending on desired functionality, the mobile device can respond to an outage of RTK measurement data in different ways. For example, according to some embodiments, the mobile device may determine the correction term (e.g., perform the functionality at block 720) responsive to determining the unavailability of RTK measurement information. In alternative embodiments, the mobile device may maintain an ongoing correction term (e.g., determining an correction term each time an RTK-based location is determined for the mobile device), and utilize the correction term when RTK measurement information is unavailable. Thus, according to these embodiments, the method 700 may comprise determining and unavailability of RTK measurement information, and responsive to determining the unavailability of the RTK measurement information, determining to base the determination of the second location of the mobile device at least in part on the correction term. Again, alternative embodiments may not necessarily be limited to RTK measurement information or outages, and may perform a similar functionality in the case of similar data outages.

FIG. 8 is a block diagram of various hardware and software components of a rover station 310, according to an embodiment. These components can be utilized as described herein above (e.g. in association with FIGS. 1-7). For example, the rover station 310 can perform the actions of the rover station 310 illustrated in FIGS. 4 and 7, and/or one or more of the functions of the method 700 illustrated in FIG. 7. It should be noted that FIG. 8 is meant only to provide a generalized illustration of various components, any or all of which may be utilized as appropriate. As previously noted, rover stations 310 may vary in form and function, and may ultimately comprise any GNSS-enabled device, including vehicles, commercial and consumer electronic devices, survey equipment, and more. Thus, in some instances, components illustrated by FIG. 8 can be localized to a single physical device and/or distributed among various networked devices, which may be disposed at different physical locations (e.g., different locations of a vehicle).

The rover station 310 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics processing units (GPUs), application specific integrated circuits (ASICs), and/or the like), and/or other processing structure or means. As shown in FIG. 8, some embodiments may have a separate Digital Signal Processor (DSP) 820, depending on desired functionality. Location determination and/or other determinations based on wireless communication may be provided in the processing unit(s) 810 and/or wireless communication interface 830 (discussed below). The rover station 310 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like. As will be appreciated, the type of input devices 870 and output devices 815 may depend on the type of rover station 310 with which the input devices 870 and output devices 815 are integrated.

The rover station 310 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the rover station 310 to communicate via the networks described above with regard to FIG. 1. The wireless communication interface 830 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 832 that send and/or receive wireless signals 834. The antenna(s) 832 may comprise a one or more discrete antennas, one or more antenna arrays, or any combination.

Depending on desired functionality, the wireless communication interface 830 may comprise separate transceivers, a separate receiver and transmitter, or any combination of transceivers, transmitters, and/or receivers to communicate with base stations and other terrestrial transceivers, such as wireless devices and access points. The rover station 310 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE™, LTE™ Advanced, 5G NR, and so on. 5G NR, Long-Term Evolution (LTE™), LTE Advanced, GSM, and WCDMA are described in documents from the Third Generation Partnership Project (3GPP™) Cdma2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The rover station 310 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the rover station 310 may also include a GNSS receiver 880 capable of receiving signals 884 from one or more GNSS satellites (e.g., SVs 340) as described herein using an antenna 882 (which could be the same as antenna 832). The GNSS receiver 880 can extract a position of the rover station 310, using conventional techniques, from GNSS SVs of a GNSS system (e.g., SVs 340 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 880 can be used with various augmentation systems (e.g., SBAS) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component with a distinct antenna 882, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 810, DSP 820, and/or a processing unit within the wireless communication interface 830 (e.g., in a modem). A GNSS receiver may optionally also include a positioning engine (e.g., the previously-mentioned SPE or PPE), which can use GNSS measurements from the measurement engine to determine a position of the GNSS receiver. The positioning engine also be executed by one or more processing units, such as processing unit(s) 810 or DSP 820. The processing unit(s) executing the positioning engine may be the same or different than the processing unit(s) executing the measurement engine.

The rover station 310 may further include and/or be in communication with a memory 860. The memory 860 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the rover station 310 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the rover station 310 (and/or processing unit(s) 810 or DSP 820 within rover station 310). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "generating," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of Real-Time Kinematic (RTK) positioning of a mobile device, the method comprising:
    obtaining a first Global Navigation Satellite System (GNSS) measurement at a first time, wherein the first GNSS measurement comprises an ionosphere-free carrier phase combination at a first location of the mobile device;
    determining a correction term based at least in part on:
        the first GNSS measurement,
        the first location,
        a position error estimate of the first location, and
        an estimate of troposphere wet zenith delay error at the first time;
    obtaining a second GNSS measurement at a second time, wherein:
        the second GNSS measurement comprises an ionosphere-free carrier phase combination at a second location of the mobile device;
    determining the second location of the mobile device at the second time based at least in part on the second GNSS measurement and the correction term, wherein determining the second location comprises:
        determining a difference between the position error estimate of the first location and a position error estimate of the second location, and
        determining a difference between the estimate of troposphere wet zenith delay error at the first time and an estimate of troposphere wet zenith delay error at the second time;
    determining an existence of a request condition at a third time, subsequent to the second time, wherein the request condition comprises:
        a threshold amount of time has passed since the first time, or
        the mobile device has moved a threshold distance since the first time, or
        a combination thereof;
    responsive to determining the existence of the request condition, requesting first RTK measurement information from a first base station;
    receiving the first RTK measurement information from the first base station; and
    determining a third location of the mobile device using the first RTK measurement information.

2. The method of claim 1, wherein the ionosphere-free carrier phase combination for the first GNSS measurement and the ionosphere-free carrier phase combination for the second GNSS measurement have the same ambiguity term.

3. The method of claim 1, wherein determining the second location of the mobile device at the second time is performed without receiving second RTK measurement information at a time subsequent to the first time and prior to the second time.

4. The method of claim 1, further comprising conducting a between-satellite single difference to obtain one or more corrections for one or more errors related to receiver clock, GNSS inter/intra frequency and constellation biases, or receiver phase center variation effect, or any combination thereof, wherein determining the correction term is further based at least in part on the one or more corrections.

5. The method of claim 1, further comprising obtaining correction data from a source that is not an RTK service, wherein:
    the correction data comprises data enabling orbital correction, clock correction, or both; and
    determining the correction term is further based at least in part on the correction data.

6. The method of claim 5, wherein the source that is not an RTK service comprises another mobile device.

7. The method of claim 1, further comprising determining the first location based at least in part on second RTK measurement information received from the first base station or a second base station.

8. The method of claim 1, further comprising, for each additional time of one or more additional times subsequent to the second time:
   taking a new respective GNSS measurement at the respective additional time, wherein:
      the new respective GNSS measurement comprises an ionosphere-free carrier phase combination, and
      the ionosphere-free carrier phase combinations for the first GNSS measurement and the new respective GNSS measurement have the same ambiguity term; and
   determining a location of the mobile device at the respective additional time based at least in part on the new respective GNSS measurement and the correction term.

9. The method of claim 1, further comprising determining an unavailability of second RTK measurement information, wherein determining the correction term is responsive to determining the unavailability of the second RTK measurement information.

10. The method of claim 1, further comprising:
    determining an unavailability of second RTK measurement information, and
    responsive determining to the unavailability of the second RTK measurement information, determining to base the determination of the second location of the mobile device at least in part on the correction term.

11. The method of claim 1, further comprising determining the threshold amount of time based, at least in part, on an accuracy requirement of an application executed by the mobile device.

12. The method of claim 1, further comprising determining the threshold amount of time based, at least in part, on an environment of the mobile device.

13. A mobile device comprising:
    a memory; and
    one or more processing units communicatively coupled with the memory and further communicatively coupled with or configured to execute a Global Navigation Satellite System (GNSS) receiver, wherein the one or more processing units are configured to:
       obtain, via the GNSS receiver, a first GNSS measurement at a first time, wherein the first GNSS measurement comprises an ionosphere-free carrier phase combination at a first location of the mobile device;
       generate a correction term based at least in part on:
          the first GNSS measurement,
          the first location,
          a position error estimate of the first location, and
          an estimate of troposphere wet zenith delay error at the first time
       obtain, via the GNSS receiver, a second GNSS measurement at a second time, wherein:
          the second GNSS measurement comprises an ionosphere-free carrier phase combination at a second location of the mobile device;
       determine the second location of the mobile device at the second time based at least in part on the second GNSS measurement and the correction term, wherein determining the second location comprises:
          determining a difference between the position error estimate of the first location and a position error estimate of the second location, and
          determining a difference between the estimate of troposphere wet zenith delay error at the first time and an estimate of troposphere wet zenith delay error at the second time;
       determine an existence of a request condition at a third time, subsequent to the second time, wherein the request condition comprises:
          a threshold amount of time has passed since the first time, or
          the mobile device has moved a threshold distance since the first time, or
          a combination thereof;
       responsive to determining the existence of the request condition, request first Real-Time Kinematic (RTK) measurement information from a first base station;
       receive the first RTK measurement information from the first base station; and
       determine a third location of the mobile device using the first RTK measurement information.

14. The mobile device of claim 13, wherein the one or more processing units are further configured to obtain the second GNSS measurement such that the ionosphere-free carrier phase combination for the first GNSS measurement and the ionosphere-free carrier phase combination for the second GNSS measurement have the same ambiguity term.

15. The mobile device of claim 13, wherein the one or more processing units are further configured to determine the second location of the mobile device at the second time without receiving second RTK measurement information at a time subsequent to the first time and prior to the second time.

16. The mobile device of claim 13, further comprising the GNSS receiver.

17. The mobile device of claim 13, wherein the one or more processing units are further configured to conduct a between-satellite single difference to obtain one or more corrections for one or more errors related to receiver clock, GNSS inter/intra frequency and constellation biases, or receiver phase center variation effect, or any combination thereof; and wherein, the one or more processing units are configured to generate the correction term based at least in part on the one or more corrections.

18. The mobile device of claim 13, further comprising a wireless communication interface, and wherein the one or more processing units are configured to obtain, via the wireless communication interface, correction data from a source that is not an RTK service, wherein:
    the correction data comprises data enabling orbital correction, clock correction, or both; and
    the one or more processing units are configured to generate the correction term based at least in part on the correction data.

19. The mobile device of claim 18, wherein the one or more processing units are configured to obtain the correction data from another mobile device.

20. The mobile device of claim 13, wherein the one or more processing units are further configured to determine the first location based at least in part on second RTK measurement information received from the first base station or a second base station.

21. The mobile device of claim 13, wherein the one or more processing units are further configured to, for each additional time of one or more additional times subsequent to the second time:

take a new respective GNSS measurement at the respective additional time, wherein:
the new respective GNSS measurement comprises an ionosphere-free carrier phase combination, and
the ionosphere-free carrier phase combinations for the first GNSS measurement and the new respective GNSS measurement have the same ambiguity term; and
determine a location of the mobile device at the respective additional time based at least in part on the new respective GNSS measurement and the correction term.

22. The mobile device of claim 13, wherein the one or more processing units are further configured to:
determine an unavailability of second RTK measurement information; and
determine the correction term responsive to determining the unavailability of the second RTK measurement information.

23. The mobile device of claim 13, wherein the one or more processing units are further configured to:
determine an unavailability of second RTK measurement information, and
determine to base the determination of the second location of the mobile device at least in part on the correction term in response to determining to the unavailability of the second RTK measurement information.

24. The mobile device of claim 13, wherein the one or more processing units are further configured to determine the threshold amount of time based, at least in part, on an accuracy requirement of an application executed by the mobile device.

25. The mobile device of claim 13, wherein the one or more processing units are further configured to determine the threshold amount of time based, at least in part, on an environment of the mobile device.

26. A device comprising:
means for obtaining a first Global Navigation Satellite System (GNSS) measurement at a first time, wherein the first GNSS measurement comprises an ionosphere-free carrier phase combination at a first location of a mobile device;
means for generating a correction term based at least in part on:
the first GNSS measurement,
the first location,
a position error estimate of the first location, and
an estimate of troposphere wet zenith delay error at the first time;
means for obtaining a second GNSS measurement at a second time, wherein:
the second GNSS measurement comprises an ionosphere-free carrier phase combination at a second location of the mobile device;
means for determining the second location of the mobile device at the second time based at least in part on the second GNSS measurement and the correction term, wherein the means for determining the second location comprises:
means for determining a difference between the position error estimate of the first location and a position error estimate of the second location, and
means for determining a difference between the estimate of troposphere wet zenith delay error at the first time and an estimate of troposphere wet zenith delay error at the second time;

means for determining an existence of a request condition at a third time, subsequent to the second time, wherein the request condition comprises:
a threshold amount of time has passed since the first time, or
the mobile device has moved a threshold distance since the first time, or
a combination thereof;
means for requesting first Real-Time Kinematic (RTK) measurement information from a first base station, responsive to determining the existence of the request condition;
means for receiving the first RTK measurement information from the first base station; and
means for determining a third location of the mobile device using the first RTK measurement information.

27. The device of claim 26, wherein the means for determining the second location of the mobile device at the second time comprise means for determining the second location of the mobile device at the second time without receiving second RTK measurement information at a time subsequent to the first time and prior to the second time.

28. The device of claim 26, further comprising means for conducting between-satellite single difference to obtain one or more corrections for one or more errors related t receiver clock, GNSS inter/intra frequency and constellation biases, or receiver phase center variation effect, or any combination thereof, wherein the means for generating the correction term comprise means for basing the correction term at least in part on the one or more corrections.

29. The device of claim 26, further comprising means for obtaining correction data from a source that is not an RTK service, wherein:
the correction data comprises data enabling orbital correction, clock correction, or both; and
the means for generating the correction term comprise means for basing the correction term at least in part the correction data.

30. The device of claim 29, wherein means for obtaining correction data from a source that is not an RTK service comprises means for obtaining the correction data from another mobile device.

31. The device of claim 26, further comprising means for determining the first location based at least in part on second RTK measurement information received from the first base station or a second base station.

32. The device of claim 26, further comprising:
means for, for each additional time of one or more additional times subsequent to the second time, taking a new respective GNSS measurement at the respective additional time, wherein:
the new respective GNSS measurement comprises an ionosphere-free carrier phase combination, and
the ionosphere-free carrier phase combinations for the first GNSS measurement and the new respective GNSS measurement have the same ambiguity term; and
means for, for each additional time of the one or more additional times subsequent to the second time, determining a location of the mobile device at the respective additional time based at least in part on the new respective GNSS measurement and the correction term.

33. The device of claim 26, further comprising means for determining an unavailability of second RTK measurement information, wherein the means for determining the correction term comprise means for determining the correction term responsive to determining the unavailability of the second RTK measurement information.

34. The device of claim 26, further comprising:
means for determining an unavailability of second RTK measurement information, and
means for determining to base the determination of the second location of the mobile device at least in part on the correction term in response to determining to the unavailability of the second RTK measurement information.

35. The device of claim 26, further comprising means for determining the threshold amount of time based, at least in part, on an accuracy requirement of an application executed by the mobile device.

36. The device of claim 26, further comprising means for determining the threshold amount of time based, at least in part, on an environment of the mobile device.

37. A non-transitory computer-readable medium having instructions thereon for Real-Time Kinematic (RTK) positioning of a mobile device, wherein the instructions, when executed by one or more processing units, cause the one or more processing units to:
obtain a first Global Navigation Satellite System (GNSS) measurement at a first time, wherein the first GNSS measurement comprises an ionosphere-free carrier phase combination at a first location of the mobile device;
generate a correction term based at least in part on:
the first GNSS measurement,
the first location,
a position error estimate of the first location, and
an estimate of troposphere wet zenith delay error at the first time;
obtain a second GNSS measurement at a second time, wherein:
the second GNSS measurement comprises an ionosphere-free carrier phase combination at a second location of the mobile device; and
determine the second location of the mobile device at the second time based at least in part on the second GNSS measurement and the correction term, wherein determining the second location comprises:
determining a difference between the position error estimate of the first location and a position error estimate of the second location, and
determining a difference between the estimate of troposphere wet zenith delay error at the first time and an estimate of troposphere wet zenith delay error at the second time;
determine an existence of a request condition at a third time, subsequent to the second time, wherein the request condition comprises:
a threshold amount of time has passed since the first time, or
the mobile device has moved a threshold distance since the first time, or
a combination thereof;
request first Real-Time Kinematic (RTK) measurement information from a first base station, responsive to determining the existence of the request condition;
receive the first RTK measurement information from the first base station; and
determine a third location of the mobile device using the first RTK measurement information.

38. The non-transitory computer-readable medium of claim 37, wherein, to determine the second location of the mobile device at the second time, the instructions, when executed by the one or more processing units, cause the one or more processing units to determine the second location of the mobile device at the second time without receiving second RTK measurement information at a time subsequent to the first time and prior to the second time.

39. The non-transitory computer-readable medium of claim 37, wherein the instructions, when executed by the one or more processing units, further cause the one or more processing units to conduct a between-satellite single difference to obtain one or more corrections for one or more errors related to receiver clock, GNSS inter/intra frequency and constellation biases, or receiver phase center variation effect, or any combination thereof; and wherein, to generate the correction term, the instructions, when executed by the one or more processing units, further cause the one or more processing units to base the correction term at least in part on the one or more corrections.

40. The non-transitory computer-readable medium of claim 37, wherein the instructions, when executed by the one or more processing units, further cause the one or more processing units to obtain correction data from a source that is not an RTK service, wherein:
the correction data comprises data enabling orbital correction, clock correction, or both; and
generating the correction term is further based at least in part on the correction data.

41. The non-transitory computer-readable medium of claim 40, wherein, to obtain correction data from the source that is not an RTK service, the instructions, when executed by the one or more processing units, further cause the one or more processing units to obtain the correction data from another mobile device.

42. The non-transitory computer-readable medium of claim 37, wherein the instructions, when executed by the one or more processing units, further cause the one or more processing units to determine the first location based at least in part on second RTK measurement information received from the first base station or a second base station.

43. The non-transitory computer-readable medium of claim 37, wherein the instructions, when executed by the one or more processing units, further cause the one or more processing units to, for each additional time of one or more additional times subsequent to the second time:
take a new respective GNSS measurement at the respective additional time, wherein:
the new respective GNSS measurement comprises an ionosphere-free carrier phase combination, and
the ionosphere-free carrier phase combinations for the first GNSS measurement and the new respective GNSS measurement have the same ambiguity term; and
determine a location of the mobile device at the respective additional time based at least in part on the new respective GNSS measurement and the correction term.

44. The non-transitory computer-readable medium of claim 37, wherein the instructions, when executed by the one or more processing units, further cause the one or more processing units to:
determine an unavailability of second RTK measurement information; and
determine the correction term responsive to determining the unavailability of the second RTK measurement information.

45. The non-transitory computer-readable medium of claim 37, wherein the instructions, when executed by the one or more processing units, further cause the one or more processing units to:

determine an unavailability of second RTK measurement information, and determine to base the determination of the second location of the mobile device at least in part on the correction term in response to determining to the unavailability of the second RTK measurement information.

46. The non-transitory computer-readable medium of claim 37, wherein the instructions, when executed by the one or more processing units, further cause the one or more processing units determine the threshold amount of time based, at least in part, on an accuracy requirement of an application executed by the mobile device.

47. The non-transitory computer-readable medium of claim 37, wherein the instructions, when executed by the one or more processing units, further cause the one or more processing units determine the threshold amount of time based, at least in part, on an environment of the mobile device.

* * * * *